US009529429B2

(12) United States Patent
Saint-Requier et al.

(10) Patent No.: US 9,529,429 B2
(45) Date of Patent: Dec. 27, 2016

(54) SYSTEM AND METHOD FOR CONTROLLING THE POSITION OF A MOVABLE OBJECT ON A VIEWING DEVICE

(71) Applicant: DASSAULT AVIATION, Paris (FR)

(72) Inventors: Cyril Saint-Requier, Montigny-le-Bretonneux (FR); Audren Kervella, Le Chesnay (FR)

(73) Assignee: DASSAULT AVIATION, Paris (FR)

( * ) Notice: Subject to any disclaimer, the term of this patent is extended or adjusted under 35 U.S.C. 154(b) by 315 days.

(21) Appl. No.: 14/017,459

(22) Filed: Sep. 4, 2013

(65) Prior Publication Data
US 2014/0062880 A1 Mar. 6, 2014

(30) Foreign Application Priority Data

Sep. 5, 2012 (FR) ...................... 12 02373

(51) Int. Cl.
G06F 3/01 (2006.01)
G06F 3/147 (2006.01)
B64D 43/00 (2006.01)
G06F 3/0354 (2013.01)
G06F 3/0481 (2013.01)

(52) U.S. Cl.
CPC ............. *G06F 3/013* (2013.01); *B64D 43/00* (2013.01); *G06F 3/012* (2013.01); *G06F 3/03549* (2013.01); *G06F 3/04812* (2013.01); *G06F 3/147* (2013.01); *G09G 2380/12* (2013.01)

(58) Field of Classification Search
CPC .. G06F 3/012; G06F 3/013; B60K 2350/2013; B60K 2350/965; B64D 43/00; G09B 9/302; G09G 2380/12
USPC .......................................... 345/158
See application file for complete search history.

(56) References Cited

U.S. PATENT DOCUMENTS

| 4,109,145 A | 8/1978 | Graf | |
|---|---|---|---|
| 4,973,149 A | 11/1990 | Hutchinson | |
| 2005/0073136 A1* | 4/2005 | Larsson | A61B 3/113 280/735 |
| 2010/0182232 A1* | 7/2010 | Zamoyski | G06F 3/013 345/157 |
| 2011/0310001 A1 | 12/2011 | Madau et al. | |

FOREIGN PATENT DOCUMENTS

WO 03017203 A1 2/2003

OTHER PUBLICATIONS

Search Report (INPI, French Patent Office); FR 1202373; Nov. 2012.

* cited by examiner

*Primary Examiner* — Stephen Sherman
(74) *Attorney, Agent, or Firm* — Davidson, Davidson & Kappel, LLC

(57) ABSTRACT

A system for controlling the position of a movable object on a viewing device in an aircraft cockpit, which can be actuated by an operator includes means for determining, at least at one given moment, a position of a target zone on said viewing device toward which the operator's gaze is directed, and positioning means adapted for placing the object on the target zone of the viewing device.

18 Claims, 3 Drawing Sheets

SYSTEM AND METHOD FOR CONTROLLING THE POSITION OF A MOVABLE OBJECT ON A VIEWING DEVICE

BACKGROUND OF THE INVENTION

Field of the Invention

The present invention relates to a system for controlling a position of a movable object on a viewing device in an aircraft cockpit, said system being configured to be actuated by an operator.

It in particular applies to the positioning of a cursor on the viewing displays positioned in the cockpit of the aircraft.

Description of the Related Art

Within the cockpit, such viewing displays allow pilots to interact with the airplane systems. This interaction is traditionally done using cursors, which are piloted using a dedicated control device of the mouse type.

Each pilot thus has access to a cursor control device (CCD), comprising a trackball that can be actuated by the pilot to move the cursor, as well as buttons allowing the pilot, once the cursor is positioned in the desired zone, to modify or insert values, or to make selections.

Rotating the trackball makes it possible to move the cursor on each of the displays. It also makes it possible to move the cursor from one display to another, but this mode of moving the cursor from one display to another is generally slow. The cursor control device is thus provided with a specific assignment lever making it possible to position the cursor directly in a selected display. When this assignment lever is activated, the cursor is positioned in a default position on the selected display.

In order to avoid hindering the viewing of the information on the displays, the cursor is not displayed if it is inactive. For example, if no action has been taken on the control device for a predetermined length of time, such as 30 seconds, the cursor disappears from the displays.

Two types of actions make it possible to cause the cursor to reappear: when the pilot again moves the trackball, the cursor reappears in its last position; furthermore, when the pilot assigns the cursor to one of the displays using the assignment lever, the cursor appears in the default position on the selected display. When the cursor reappears, it is temporarily surrounded by a halo so as to allow the pilot to locate it more quickly on the displays.

However, although the cursor is thus specifically identified when it is reactivated, it is not always easy for the pilot to find it immediately. Furthermore, the default position in which the cursor is positioned on a display may be remote from the zone of interest where the pilot wishes to work.

Furthermore, moving the cursor using the trackball is limited in terms of speed. Thus, the time the pilot spends locating the cursor or moving it on the display is lost time during which the pilot is not available to perform the tasks for which he is responsible. The use of the cursor being the favored method of interacting with the systems, this time may be significant, in particular over a long flight time.

Moreover, this method of controlling the position of the cursor does not work if the aircraft is equipped with a small number of large displays, or even a single display. In fact, the assignment command of the cursor on a specific display is then meaningless, and the path to be traveled by the cursor between two remote points of a single display it makes the entire concept of interaction not very viable during operational use.

SUMMARY OF THE INVENTION

The aim of the invention is therefore to propose a control system not having these drawbacks, and allowing quick and effective positioning of an object on a viewing device in a cockpit of an aircraft.

To that end, the invention relates to a system of the aforementioned type, characterized in that it comprises:
 means for determining, at least at one given moment, a position of a target zone on said viewing device toward which the operator's gaze is directed,
 positioning means adapted for placing the object on the target zone of the viewing device.

According to other aspects of the invention, the system comprises one or more of the following features:
 said means for determining the position of the target zone comprise:
  means for acquiring an axis of the operator's gaze,
  means for detecting the position of said target zone based on a zone of intersection between said axis of the gaze and a display plane of said viewing device;
 said acquisition means are adapted for determining a position and orientation of the operator's head, and determining said axis of direction based on the position and orientation of the operator's head;
 said acquisition means are adapted for determining a position and orientation of the operator's eyes, and determining said axis of direction as a function of the position and orientation of the operator's eyes;
 said acquisition means comprise at least one camera;
 the or each camera is positioned in said cockpit such that the left and right angular paths of the pilot's gaze with respect to an axis linking a predetermined mean position of the pilot's head and the camera, to scan said viewing device, are substantially identical;
 the acquisition means comprise at least one camera adapted for capturing infrared rays;
 the system further comprises means for filtering unwanted movements by the operator, in particular movements due to turbulence experienced by the aircraft;
 the system further comprises an activation command, adapted for commanding a display by the positioning means of said object on the target zone of the viewing device, in response to an actuation by the operator;
 the system further comprises a manual control device for controlling the position of the object;
 the activation command is positioned on said manual control device;
 the activation command is chosen from among:
  an activation command adapted for commanding said display over time intervals comprised between the actuation and the release by said operator of said activation command,
  an activation command adapted for commanding said display during a time interval comprised between a first and second actuation by said operator of said activation command,
  an activation command adapted for commanding said display during a predefined time interval after point actuation of said activation command by the operator;
 the system is suitable for an adjustment to the position of the object placed by the positioning means to be done using the manual control device;
 the determination means are adapted for determining a plurality of successive positions of the target zone, and the positioning means are adapted for moving the object successively toward positions of the plurality of positions;

the viewing device comprises a plurality of displays, the determination means being adapted for determining on which display of said viewing device the target zone is located;

the object is a cursor on a display screen.

The invention also relates to a method for controlling a position adapted for a movable object on a viewing device in an aircraft cockpit, characterized in that it comprises:

determining, at least at one given moment, a position of a target zone on said viewing device toward which an operator's gaze is directed, positioning said object on said target zone of the viewing device;

the method comprises:

a first positioning of the object on the target zone of the viewing device, and a second positioning of the object using a manual control device for controlling the position of said object;

the second positioning of the object by the manual control device for controlling the position of the object is an adjustment of the first position of the object on the target zone of the viewing device.

According to another aspect of the invention, the determination of the position of said target zone comprises:

acquiring an axis of direction of the operator's gaze, detecting the position of said target zone based on an intersection zone between said axis of direction of the gaze and a display plane of said viewing device.

The invention also relates to an aircraft cockpit comprising a viewing device and a control system for controlling the position of a movable object on that viewing device according to the invention.

The invention will be better understood upon reading the following description, provided solely as an example, and done in reference to the appended drawings, in which:

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
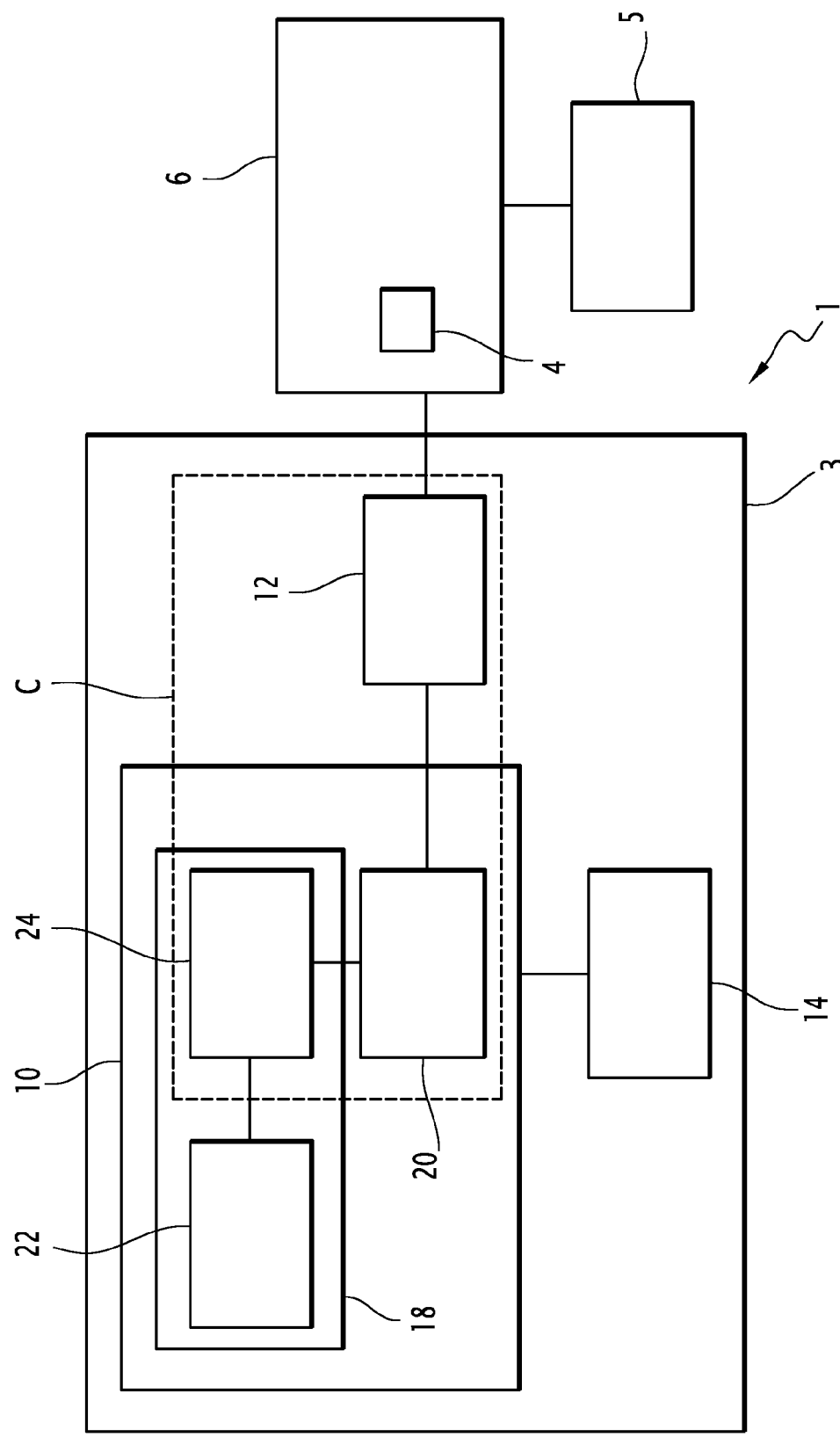
FIG. 1 is a diagram of a control system according to one embodiment of the invention.

FIG. 1 diagrammatically shows a system 1 according to the invention, for an operator, in particular a pilot, to control a movable object 4 such as a cursor on a viewing device 6 positioned in the cockpit of an aircraft.

The viewing device for example comprises several displays on which the cursor 4 can move, in response to an action by the operator on the control system 1.

The control system 1 comprises visual control means 3 for controlling the position of the cursor 4, adapted for positioning and moving the cursor 4 over a zone of the viewing device 6 targeted by the pilot's gaze.

The system 1 also comprises manual control means 5 for controlling the position of the cursor 4, adapted for moving the cursor on the viewing device 6 in response to a manual action by the operator.

The visual control means 3 comprise an input module 10 for the gaze, adapted for determining, at least at one given moment, the position of the target zone targeted by the operator's gaze on the viewing device 6.

The visual control means 3 also comprise an interface module 12, adapted for managing the movement of the cursor 4 on the viewing device 6 based on the target zone targeted by the operator's gaze as determined by the input module 10.

The visual control means 3 further comprise an activation command 14, the activation of which by a pilot is adapted for generating the positioning by the interface module 12 of the cursor 4 in the target zone of the viewing device 6.

The input module 10 comprises acquisition means 18, adapted for determining the directional axis of the operator's gaze, and an application 20 for detecting the position of the target zone based on an intersection zone between that directional axis of the gaze and a display plane of the viewing device.

Furthermore, the input module 10 is adapted for sending the interface module 12 the position of the target zone thus determined.

The acquisition means 18 comprise a device 22 for acquiring data relative to the position and orientation of the pilot's gaze, and an application 24 for determining the directional axis of the operator's gaze from that data.

The application 24 is an application stored in the memory of a computer C of the aircraft and executed by a processor of the computer.

The acquisition device 22 for example comprises a camera, advantageously adapted for capturing radiation both in the visible domain and the infrared domain, such that it is adapted for acquiring the image of the pilot irrespective of the luminosity conditions, in particular in low light.

For example, the device 22 is adapted for acquiring data relative to the position and orientation of the pilot's head, from which the application 24 determines the orientation axis of the pilot's head, and therefore his gaze.

Figures 2, 3:
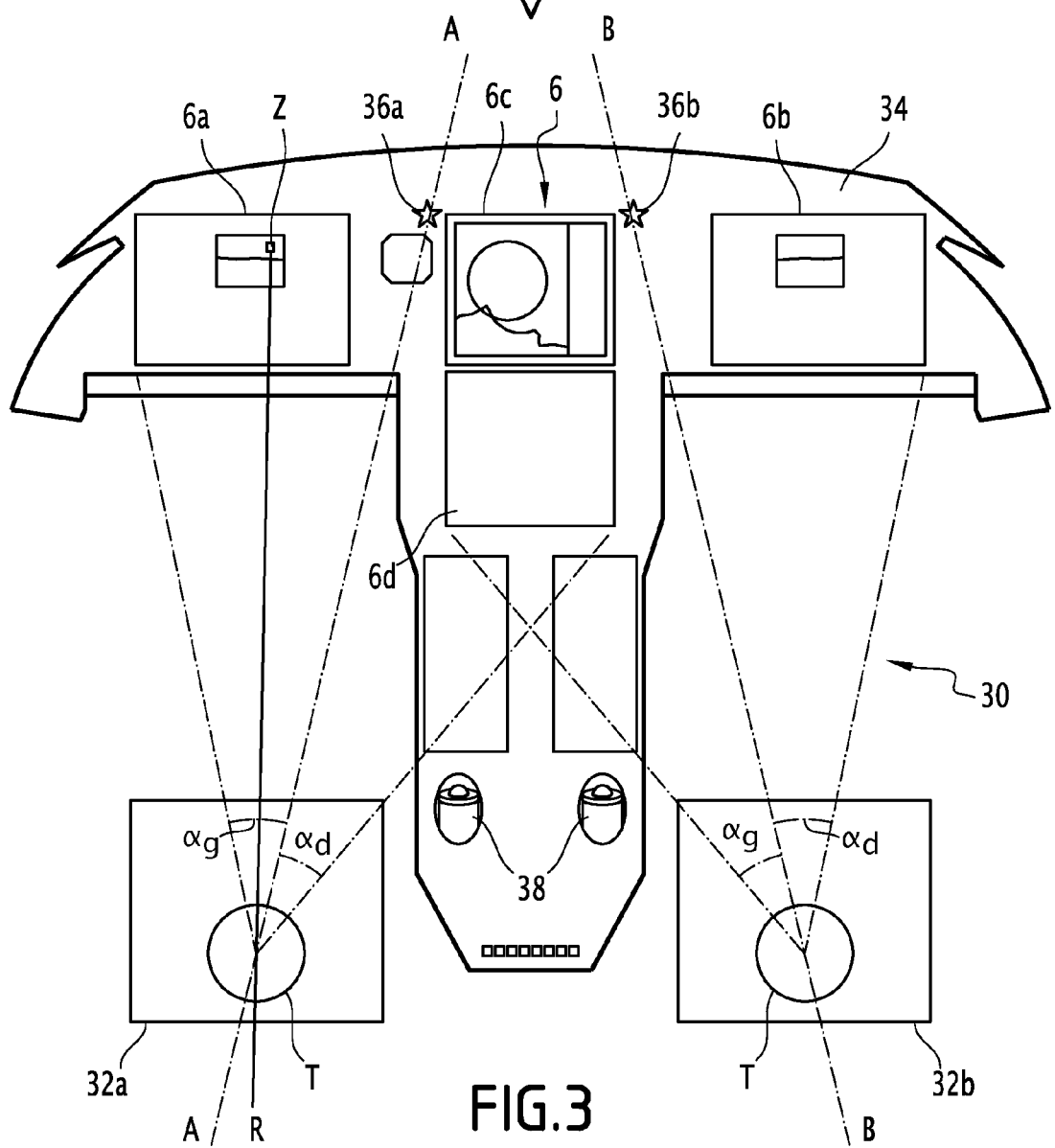
FIG. 2 is a diagrammatic view of a detail of the control system of FIG. 1.
FIG. 3 is a diagrammatic view of an aircraft cockpit comprising the control system of FIG. 1.

This embodiment is advantageously implemented through the acquisition by the device 22 of an image of the pilot's head and his surroundings, the application 24 being adapted for analyzing that image to detect a geometric figure formed by the elements of the pilot's face and deducing the position and orientation of that face therefrom. FIG. 2 thus shows one example of a geometric figure detected by the application 24, formed by the eyes Y and the nose N of the pilot.

The determination of the position and orientation of this geometric figure at a given determination moment $t_n$ is for example done with respect to reference points positioned fixedly in the cockpit, in particular on the pilot's seat.

Alternatively, the determination of the position and orientation of this geometric figure at a given determination moment $t_n$ is done by a comparison with the position and orientation determined at the earlier determination moment $t_{n-1}$. Thus, the application 24 determines the distance between the geometric figure at moment $t_n$ and that at moment $t_{n-1}$, as well as the spatial angle of rotation of the geometric figure between these two moments, to deduce, from the position and orientation at the moment $t_{n-1}$, the position and orientation at moment $t_n$.

This angle of rotation measures the rotation of the geometric figure with respect to three axes of an orthogonal reference. This makes it possible to determine the direction of the pilot's gaze both in a horizontal plane and a vertical plane, and therefore to move the cursor 4 in all directions on the viewing device 6.

However, to avoid a drift over time of the position and orientation thus determined, due to a build-up of measuring errors, the application 24 is adapted for recalibrating itself periodically by determining, at certain determination moments, the position and orientation of the geometric figure with respect to the reference points positioned fixedly in the cockpit.

The detection application 20 for detecting the position of the target zone is also an application stored in the memory of the computer C and executed by a processor of the computer.

The application 20 is adapted for determining the zone of the viewing device 6 targeted by the pilot's gaze, by calculating a point of intersection between the directional axis of the gaze determined by the acquisition means 18 and a display plane of the viewing device 6, i.e., a plane of that device on which the images form.

The application 20 advantageously comprises filtering means, adapted for filtering the untimely movements of the pilot's head, resulting primarily from the turbulence of the air mass in which the aircraft is traveling.

In fact, the position of the target zone on the device 6 comprises a pilot-controlled movement component and a noise component, due to movements of the aircraft. The application 20 is thus adapted for filtering this noise component to preserve primarily the pilot-controlled movement component.

This filtering is for example done by determining, from positions of the target zone calculated at moments prior to the determination moment $t_n$, a mean movement of that target zone, and deducing, from that mean movement, the position of the target zone at the determination moment $t_n$. This filtering is more effective when the number of prior moments taken into account is high.

The interface module 12 is adapted for receiving, from the module 10, the position of the target zone targeted by the pilot at a determination moment $t_n$, and generating the position of the cursor 4 on the viewing device 6, on that target zone. These functions are also incremented by the computer C.

Advantageously, the cursor 4 is only positioned on the target zone when the activation command 14 is actuated.

The activation command 14 for example comprises a button whereof the actuation at a given moment causes the generation, by that command 14, of an activation signal intended for the module 10 for determining the position of the target zone.

The activation command 14 can be actuated between a released position and an activation position.

Advantageously, the released position is the stable default position of the activation command 14, i.e., the position of that command when no force is exerted by the pilot on that command, while the activation position is only actuated when the pilot exerts an action on the activation command 14. Furthermore, the activation signal is generated for the module 10 only when the activation command 14 is in its activation position, i.e., only when the pilot exerts an action on that command. The activation signal is therefore only generated over the time interval comprised between the actuation and the release by the pilot of the activation command 14.

The module 10 is adapted for receiving this activation signal, and determining the position of the target zone targeted by the pilot at each moment at which the activation command 14 is actuated. Thus, the module 10 sends the interface module 12 the position of the target zone determined at each of these moments.

FIG. 3 illustrates one embodiment of the control system 1 according to the invention, positioned in a cockpit 30 of an aircraft.

The cockpit 30 comprises two pilot seats 32a, 32b, and a dashboard including the viewing device 6 of the system 1.

This device 6 comprises two side displays 6a, 6b, each positioned across from a seat 32a, 32b and dedicated to the pilot seated in that seat, and two central displays 6c, 6d, positioned at the center of the dashboard 34, and dedicated to both pilots.

Each of the pilots can thus control the movement of a cursor 4 and perform actions on three of the displays of the viewing device 6.

Each cursor 4 is not displayed if it is inactive, for example if no action has been taken on the visual 3 or manual 5 control means for a predetermined length of time.

Thus, the displays 6a and 6b are generally primary flight displays displaying the flight parameters of the aircraft. The displays 6c and 6d are multisystem display units in particular provided for flight management, managing airplane systems, electronic checklists, etc. These displays are designed to display operating or navigation parameters of the aircraft.

Each of the displays 6a, 6b, 6c and 6d is adapted for displaying information relative to the flight of the aircraft and the systems of the aircraft, and allows the pilots to interact with the systems.

In this embodiment, the acquisition device 22 of the system 1 comprises two cameras 36a, 36b fastened to the dashboard, each designed to acquire data relative to the position and orientation of the gaze of one of the two pilots.

Each camera 36a is advantageously placed such that relative to an axis A-A (B-B, respectively) between the mean position of the head T of the pilot in the seat 32a (32b, respectively) and the camera 36a (36b, respectively), the left $\alpha_g$ and right $\alpha_d$ angular paths of the pilot's gaze are substantially identical. This angular path corresponds to the angles that the axis of the pilot's gaze must form with respect to the axis A or B to allow him to view all three displays dedicated to him. Such an arrangement of the cameras in particular makes it possible to balance measuring errors on either side of the axis A or B.

The mean position of the pilot's head is for example determined by a position that the pilot is likely to occupy on the seat.

FIG. 3 also shows an example of a directional axis R of the pilot's gaze and the corresponding zone Z of the viewing device 6 targeted by the pilot. This zone Z is situated at the intersection between the axis R and the display plane of the device 6, which in the illustrated example is the display plane of the display 6a.

The manual control means 5 comprise two cursor control devices 38 of the CCD type, each dedicated to a pilot.

Figure 4:
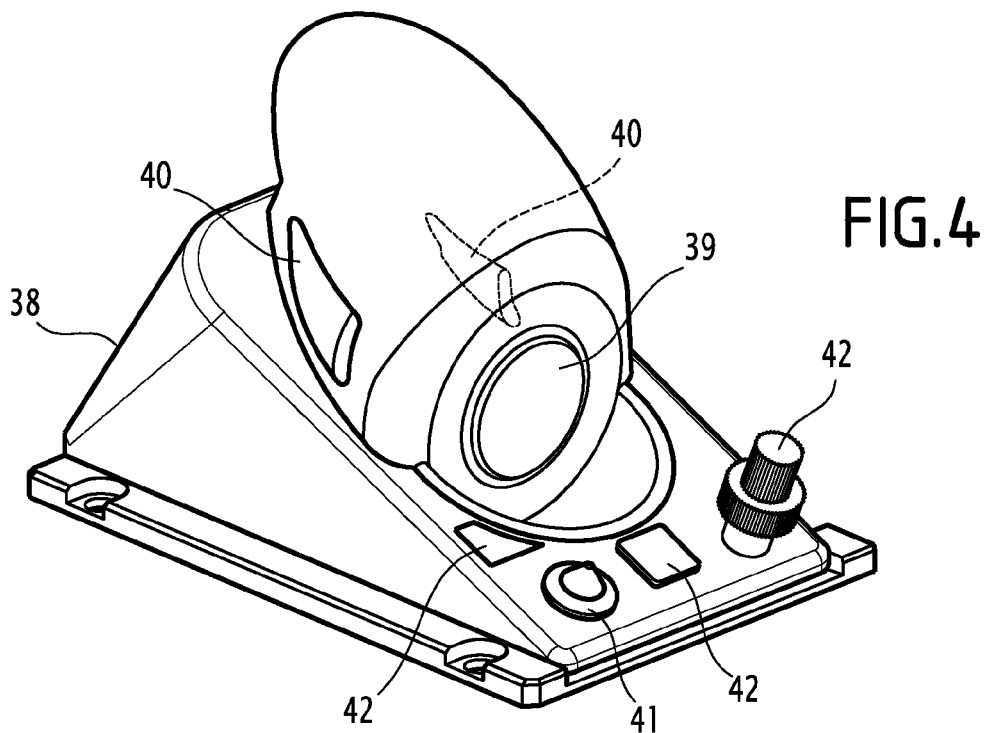
FIG. 4 is a detailed diagrammatic view of the manual control device of the system of FIG. 1.

As shown in FIG. 4, each device 38 comprises a trackball 39, the rotation of which is adapted for causing the cursor 4 to move on each of the three displays dedicated to the considered pilot, and between those three displays. The device 38 furthermore comprises two control buttons 40, positioned on either side of the trackball 39, and an assignment lever 41 making it possible to position the cursor 4 on one of the three displays dedicated to the pilot. When said assignment lever 41 is actuated, the cursor 4 is positioned in a default position on the selected display.

The device 38 further comprises other commands 42, for example making it possible to select objects on the display or allowing a menu to appear.

The activation command 14 is advantageously integrated into each device 38. For example, this activation command 14 is actuated when a pilot simultaneously actuates both control buttons 40.

Alternatively, an additional button, dedicated to the activation command 14, is provided on the device 38.

Figure 5:
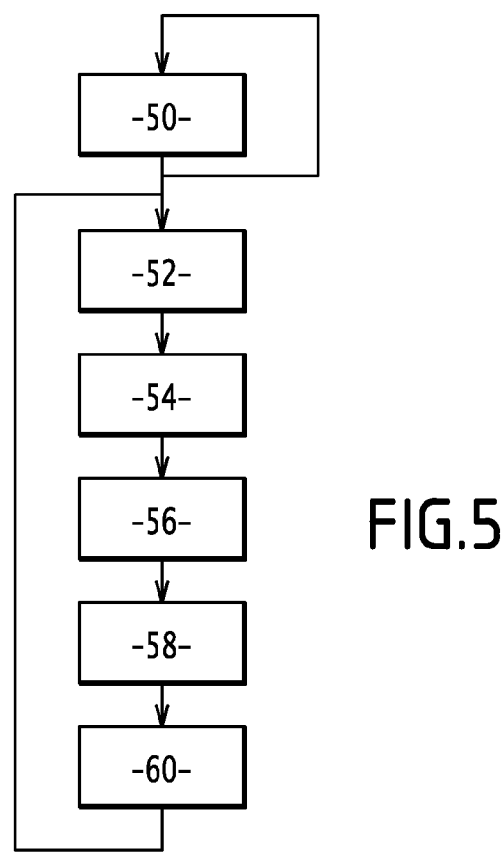
FIG. 5 is a block diagram of a control method according to the invention.

In reference to FIG. 5, the implementation of a method according to one embodiment of the invention for using the control system 1, under the control of a pilot, to move the cursor 4 on the viewing device 6 will now be described.

In an initial state 50, the activation command 14 is released. Thus, a pilot can only move the cursor 4 using the manual control means 5, i.e., the control device 36.

From this state, in a step 52, the acquisition device 22 continuously captures and records data relative to the position and orientation of the pilot's gaze.

When the pilot wishes to move the cursor quickly from one zone of the device 6 to another, or when he wishes to cause the cursor 4 to appear, if it is not displayed, the pilot actuates the visual control means 3.

To that end, the pilot orients his gaze toward the zone of the device 6 where he wishes for the cursor to be positioned, and actuates the activation command 14.

In response to this actuation, in a step 54, the activation command 14 generates an activation signal intended for the input module 10.

In a step 56, the module 10 receives this activation signal, and the application 24 determines the directional axis A of the pilot's gaze from the data relative to the position and orientation of the pilot's gaze recorded by the acquisition device 22 at the moment $t_n$ where the activation command 14 was actuated.

Then, in a step 58, the application 20 determines the zone of the viewing device 6 targeted by the pilot's gaze, by calculating a point of intersection between the directional axis of the gaze determined during step 56 and the display plane of the viewing device 6.

During the step 58, advantageously, the application 20 filters the untimely movements of the pilot's head. As previously described, this filtering is for example done by determining, from positions of the target zone calculated over a time interval $\Delta T$ prior to the determination moment $t_n$, a mean movement of the target zone, and deducing from that mean movement the position of the target zone at the determination moment $t_n$. The positions of the target zone at earlier moments are determined from data recorded by the acquisition device 22 during step 52. The time interval $\Delta T$ depends on the frequency of the untimely movements of the pilot's head primarily related to the frequency of the turbulence felt in the pilot's seat.

In a step 60, the application 20 sends the interface module 12 the position of the target zone targeted by the pilot, and the module 12 generates the positioning of the cursor 4 on that target zone of the viewing device 6.

Steps 56 to 60 are carried out as long as the pilot actuates the activation command 14. The cursor 4 is therefore moved by the module 12 only over the time interval comprised between the actuation and the release of the activation command 14 by the pilot.

The pilot can subsequently control the cursor 4 again using the visual control means 3, according to steps 52 to 60 described above, or using manual control means 5 if he wishes to adjust the position of the cursor 4 more precisely.

If the pilot does not take any action on the visual 3 or manual 5 control means, the cursor 4 disappears from the device 6 after a predetermined length of time, for example 30 seconds.

The system and method according to the invention thus allow the pilot to move the cursor 4 over the zone of interest, which he targets practically instantaneously. Furthermore, the use of the system by the pilot is intuitive and requires very little attention from him. In fact, the pilot's gaze naturally goes toward the zone of interest to him and where he wishes to place the cursor.

Furthermore, the system can be used irrespective of the number of displays of the viewing device 6. In particular, if the device 6 includes only one display, the system and the method according to the invention allow the pilot to place the cursor in a specific zone of that display practically instantaneously, which cannot operationally be done with only manual control means.

Furthermore, the system according to the invention may be used irrespective of the flight conditions of the aircraft. In particular, the use of an infrared camera allows it to be used irrespective of the luminosity conditions, while the implementation of the filtering by the application 20 allows it to be used despite turbulence experienced by the aircraft.

It must be understood that the example embodiments presented above are not limiting.

In particular, according to one alternative, the acquisition device 22 is adapted for acquiring data relative to the position and orientation of the pilot's eyes, from which the application 24 determines the orientation axis of the pilot's gaze.

According to another alternative, the acquisition device 22 is adapted for acquiring data relative to the position and orientation of both of the pilot's head and eyes, the application 24 determining the orientation axis of the pilot's gaze from these two types of information.

Furthermore, according to another embodiment of the invention, the activation signal is generated for the module 10 once the pilot exerts a force on the activation command 14, and during a predefined time interval $\Delta t$ after the pilot releases that force.

Thus, the pointwise actuation of the command 14 at an initial moment $t_i$ causes the cursor 4 to be positioned on the viewing device 6 throughout the duration $\Delta t$ after the moment $t_i$.

According to another embodiment of the invention, the activation signal is generated for the module 10 when the pilot actuates the activation command 14, and until he again actuates the activation command 14.

This embodiment is for example implemented using an activation command comprising an elastic return button, whereof a first actuation causes the generation of an activation signal for the module 10, and whereof a second actuation causes the generation of the activation signal to stop.

In this embodiment, the actuation of the command 14 at an initial moment $t_i$ thus causes the cursor 4 to be positioned on the target zone and the cursor 4 to move on the viewing device 6 according to the target zones targeted by the pilot, until the command 14 is again actuated by the pilot to regain its released position.

Thus, the module 12 generates, at each determination moment $t_n$ after the initial moment $t_i$, the positioning of the cursor 4 on the target zone targeted at that moment $t_n$. The cursor 4 therefore moves substantially continuously on the viewing device 6.

Alternatively, the released and activation positions of the activation command are two stable positions, i.e., the command is adapted for remaining in the actuated position when the pilot exerts a force on that button from the released position, and regaining its released position only in response to a new force exerted by the pilot.

When the command 14 is not activated, the position of the cursor on the device 6 may be controlled using manual control means 5.

Alternatively, the manual control means 5 may be eliminated, and the cursor controlled only by the visual control means 3.

Furthermore, the acquisition device 22 may comprise means for detecting data relative to the position and orientation of the pilot's gaze other than a camera, for example an optical device based on light beams that will or will not be intercepted based on the position of the pilot's head.

Furthermore, the activation command 14 can be placed in a location other than on the CCD cursor control device, in particular any location accessible to the pilot.

The technical features of the embodiments and alternatives mentioned above may be combined.

While the foregoing is directed to embodiments of the present invention, other and further embodiments of the invention may be devised without departing from the basic scope thereof, and the scope thereof is determined by the claims that follow.

The invention claimed is:

1. A system for controlling a position of a movable object on a viewing device in an aircraft cockpit, said system being configured to be actuated by an operator, comprising:
   target zone determiner configured for determining, at least at one given moment, a position of a target zone on said viewing device toward which the operator's gaze is directed,
   a positioner configured for placing the object on the target zone of the viewing device, and
   an activation command, actuable between a released position and an activation position, the activation command being configured to generate, in the activation position, excluding the released position, an activation signal intended for the target zone determiner for determining the position of the target zone, to command a display by the positioner of said object on the target zone of the viewing device,
   the activation command being chosen from among:
   an activation command adapted for generating said activation signal to command said display over time interval comprised between the actuation and the release by said operator of said activation command,
   an activation command adapted for generating said activation signal to command said display during a time interval comprised between a first and second actuation by said operator of said activation command, and
   an activation command adapted for generating said activation signal to command position said object on the viewing device during a predefined time interval after point exertion of a force on said activation command by the operator.

2. The system according to claim 1, wherein said target zone determiner comprises:
   an axis acquirer configured to acquire an axis of direction of the operator's gaze, and
   a position detector configured to detect the position of said target zone based on a zone of intersection between said axis of direction of the gaze and a display plane of said viewing device.

3. The system according to claim 2, wherein said axis acquirer is configured to determine a position and orientation of the operator's head, and configured to determine said axis of direction based on the position and orientation of the operator's head.

4. The system according to claim 2, wherein said axis acquirer is configured to determine a position and orientation of the operator's eyes, and configured to determine said axis of direction as a function of the position and orientation of the operator's eyes.

5. The system according to claim 2, wherein said axis acquirer comprises at least one camera.

6. The system according to claim 5, wherein the or each camera is positioned in said cockpit such that the left and right angular paths of the pilot's gaze with respect to an axis linking a predetermined mean position of the pilot's head and the camera, to scan said viewing device, are substantially identical.

7. The system according to claim 5, wherein the axis acquirer comprises at least one camera adapted for capturing infrared rays.

8. The system according to claim 1, further comprising a filter configured to filter unwanted movements of the operator, in particular movements due to turbulence experienced by the aircraft.

9. The system according to claim 1, further comprising a manual control device for controlling the position of the object.

10. The system according to claim 9, wherein said activation command is positioned on said manual control device.

11. The system according to claim 9, suitable for an adjustment to the position of the object placed by the positioner to be done using the manual control device.

12. The system according to claim 1, wherein the target zone determiner is configured for determining a plurality of successive positions of the target zone, and in that the positioner is configured for moving the object successively toward positions of the plurality of positions.

13. The system according to claim 1, wherein the viewing device comprises a plurality of displays, the target zone determiner being configured for determining on which display of said viewing device the target zone is located.

14. The system according to claim 1, wherein the object is a cursor on a display screen.

15. A method for controlling a position of a movable object on a viewing device in an aircraft cockpit, comprising:
   actuating of an activation command by an operator, and in response to the actuation, generating, by the activation command, an activation signal intended for a target zone determiner, to command a display of the object on a target zone of the viewing device,
   determining, by the target zone determiner, at least at one given moment, in response to the activation signal, a position of the target zone on said viewing device toward which an operator's gaze is directed,
   positioning said object on said target zone of the viewing device,
   displaying by a positioner of said object on the target zone of the viewing device, the activation command being chosen from among:

an activation command generating said activation signal to command said display over time interval comprised between the actuation and the release by said operator of said activation command, an activation command generating said activation signal to command said display during a time interval comprised between a first and second actuation by said operator of said activation command, and an activation command generating said activation signal to position said object on the viewing device during a predefined time interval after point exertion of a force on said activation command by the operator.

16. The control method according to claim 15, comprising:

a first positioning of the object on the target zone of the viewing device, and a second positioning of the object using a manual control device for controlling the position of said object.

17. The control method according to claim 16, wherein the second positioning of the object by the manual control device for controlling the position of the object is an adjustment of the first positioning of the object on the target zone of the viewing device.

18. The control method according to claim 15, wherein the determination of the position of said target zone comprises:

acquiring an axis of direction of the operator's gaze, and detecting the position of said target zone based on an intersection zone between said directional axis of the gaze and a display plane of said viewing device.

* * * * *